March 1, 1955     I. RABINOWITZ     2,702,930
CENTRALLY PERFORATED DISK-LIKE MEAT CASING SEAL
Filed July 5, 1952
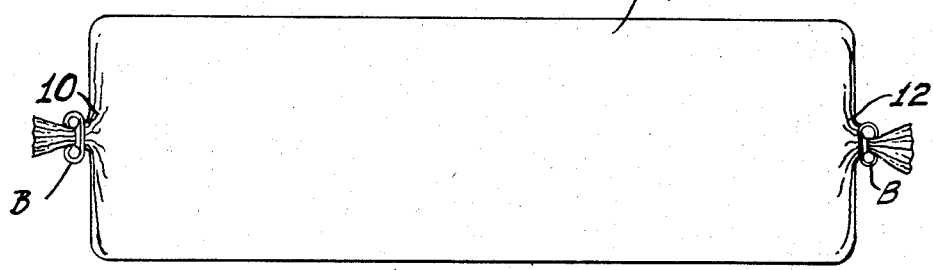
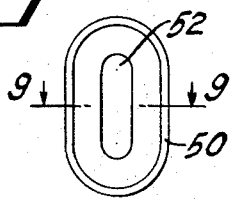
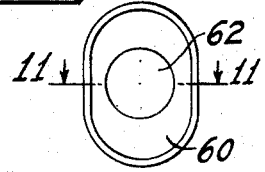
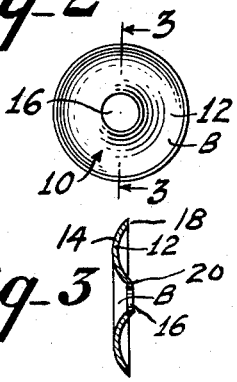
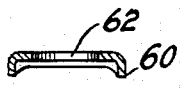
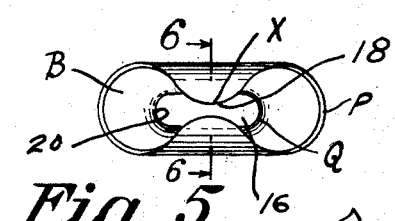
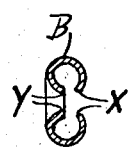
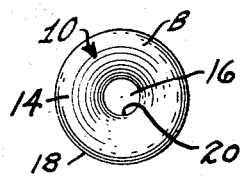
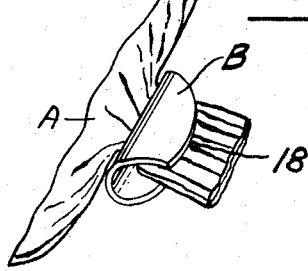
INVENTOR.
Irving Rabinowitz
BY Harry Langsam
ATTORNEY

United States Patent Office 2,702,930
Patented Mar. 1, 1955

2,702,930

CENTRALLY PERFORATED DISKLIKE MEAT CASING SEAL

Irving Rabinowitz, Philadelphia, Pa., assignor to Irving Machinery Co., Inc., Philadelphia, Pa., a corporation of Pennsylvania Application July 5, 1952, Serial No. 297,254

2 Claims. (Cl. 24—30.5)

This invention relates to a sealing disc for use with a meat packing and sealing device such as disclosed in copending patent application Serial No. 294,240 filed June 18, 1952.

Heretofore, the metallic clamps for sealing the open end of a meat casing which has been filled with a compacted meat product, have taken various forms such as cylinders, pre-formed and pre-shaped plates, barrel shaped gromets and the like. None of these has provided a satisfactory seal since they all provided point contact rather than line contact sealing.

One object of this invention, therefore, is to provide an improved means for sealing a compacted meat casing which will provide a two point casing sealing which will not open during handling.

Another object of this invention is to provide a sealing means which, although of heavy gage metal, is relatively small and light in weight; and which may readily be rolled for purposes of sealing.

Another object of this invention is to provide a sealing means which can be manufactured on a punching press.

Another object of this invention is to provide a sealing means which is adapted to be deformed into an angular line-contact pinching position against the casing at two spaced planes.

Other objects of my invention are to provide an improved device of the character described, that is easily and economically produced, which is sturdy in construction, and which is highly effective in operation.

With the above and related objects in view, my invention consists in the details of construction and combination of parts as will be more fully understood from the following description when read in conjunction with the accompanying drawing in which:

Fig. 1 is a side view of a casing showing the sealing disc in sealing position.

Fig. 2 is a front view of the disc.

Fig. 3 is sectional view taken on line 3—3 of Fig. 2.

Fig. 4 is a rear view of the disc.

Fig. 5 is a front view showing the disc bent into sealing position.

Fig. 6 is a sectional view taken on line 6—6 of Fig. 5.

Fig. 7 is a perspective view showing the disc in sealing position upon a casing.

Fig. 8 is a front view of a modification of the invention.

Fig. 9 is a sectional view taken on line 9—9 of Fig. 8.

Fig. 10 is a front view of another modification of the invention.

Fig. 11 is a sectional view taken on line 11—11 of Fig. 10.

Referring now in detail to the drawing wherein similar reference characters refer to similar parts, I show a casing, generally designated as A, made of cotton cellulose or other cellulose fibre material wherein edible meats such as a boneless ham, a boneless picnic, Canadian bacon or the like, is held.

A centrally perforated disc-like seal, generally designated as B, is preferably made of aluminum or steel. The seal B has a circular outer metallic portion 10 with a concave side 12 and a parallel convex side 14. The circular curved sides 12, 14 are defined by an outer circular edge 18 and an inner circular edge 20, the latter defining a central opening or aperture 16 in the seal B. The inner edge 20 extends to the right of a plane passing through the edge 18 as shown in Fig. 3, while the convex wall 14 is to the left of the plane defined by the edge 18.

The outer circular edge 18 is where the concave wall 12 and the convex wall 14 terminates at one end, and the inner circular edge 20 is another edge where the convex wall 14 and the concave wall 12 terminate to form a toroidal shaped seal B.

The seal B has a toroidal surface which in cross-section provides a concave wall 12 and a convex wall 14. The seal is rolled when two opposed forces are applied at diametrically opposite portions of the edge 18 at the free outer edge of the casing.

In operation, the disc-like seal B is slipped over the open end of the filled casing which is lying on a meat compression machine (not shown) and the seal is then pushed along the casing, compressing the meat within the casing in its path. A pressure applying mechanism is then used to roll the periphery of the seal B around the casing. The rolled seal B is shown in different views in Figs. 5, 6, and 7.

As the periphery 18 is rolled, the pressure deforms the edge 20 defining the perforation 16. The result is a line seal of the casing at two spaced locations, one seal being adjacent to the bent portions of the periphery as shown at X and that adjacent to the deformed inner periphery as shown at Y. It should be noted that the pressure at X and Y is angular rather than perpendicular since the concave outer periphery and the convex inner periphery do not press against the casing perpendicularly. Note especially Figs. 3 and 6. This angular pressure provides a resultant force from two directions which is greater than any similar perpendicular force. Meanwhile, the underformed portions of the inner and outer peripheries as shown at P and Q provide a reinforcing effect for the deformed portions X and Y. This is because when the portions X and Y are deformed in one direction setting up one stress, a complementary or opposite stress is imposed on the undeformed portions P and Q. The result is a stress in two directions to effect the seal rather than in only one as would be the case, if the sealing means were not a disc but merely had a pair of flanges extending from a central portion. Such flanges might have some of the characteristics of the portions X but there would be no additional stress providing means as in that case of the portions P. It has therefore been determined that only a disc such as shown here will provide a really effective seal.

The modification shown in Figs. 8 and 9 is similar to disc 10 except that this disc 50 is elongated and has an elongated central perforation 52. Such a disc is for use where the desired amount of sealing deformation of the disc is small compared to the round disc 10.

The modification shown in Figs. 10 and 11 shows a generally oval disc 60 having a wide round opening 62. This disc is for use when the desired deformation of the disc is smaller than for disc 10 but larger than for disc 50.

With my invention, the contents of the casing are firmly compressed in a relatively rapid manner and the sealing of the disc insures a very tight seal around the casing.

Although my invention has been described in considerable detail, such description is intended as being illustrative rather than limiting, since the invention may be variously embodied, and the scope of the invention is to be determined as claimed.

I claim as my invention:

1. A clamping means for a casing comprising a continuous toroidal disc-like seal having concave-convex cross-sectional surfaces terminating in a central periphery defining a central opening, the central periphery of said seal extending to one side of a plane passed through the outer peripheral edge of said seal whereby the outer periphery when compressed inwardly at two diametrically opposed points will be substantially in the same longitudinal plane as a portion of the seal defining the central aperture, the outer periphery of said seal being adapted to be rolled on diametrically opposite outer peripheral portions around a casing to pinch said casing, and one area of pinching being the periphery defining the central aperture and a second area of pinching being the outer peripheral edge of said disc so that a double pinching action occurs.

2. A clamping means for a casing comprising a continuous toroidal disc-like seal having concave-convex cross-sectional surfaces terminating in a central periphery defining a central opening, the central periphery of said seal extending substantially to a plane passed through the outer free peripheral edge of said seal whereby the outer periphery when compressed inwardly at two diametrically opposed points will be substantially in the same longitudinal plane as a portion of the seal defining the central aperture, the outer periphery of said seal being adapted to be rolled on diametrically opposite outer peripheral portions around a casing to pinch said casing, and one area of pinching being the periphery defining the central aperture and a second area of pinching being the outer peripheral edge of said disc so that a double pinching action occurs.

References Cited in the file of this patent

UNITED STATES PATENTS

| | | |
|---|---|---|
| 247,293 | Batt | Sept. 20, 1881 |
| 837,789 | Brooks | Dec. 4, 1906 |
| 1,193,699 | Keer | Aug. 8, 1916 |
| 2,460,963 | Young | Feb. 8, 1949 |
| 2,493,063 | Frank et al. | Jan. 3, 1950 |